G. R. BARKER.
Ventilators for Buildings.
No. 143,868.             Patented Oct. 21, 1873.
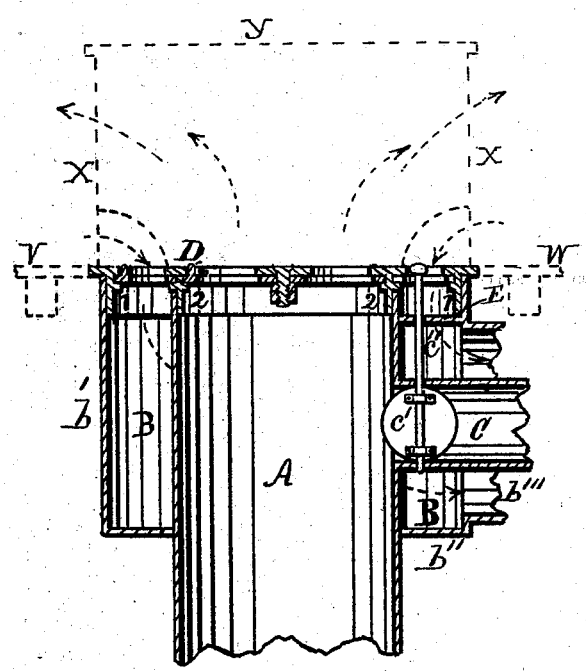
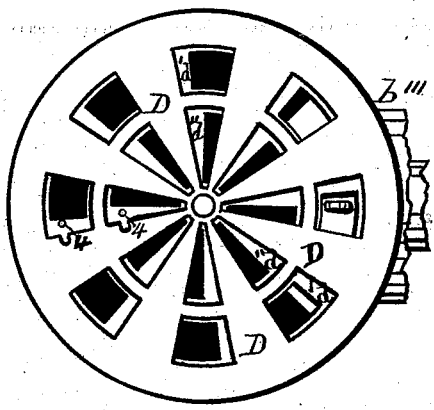
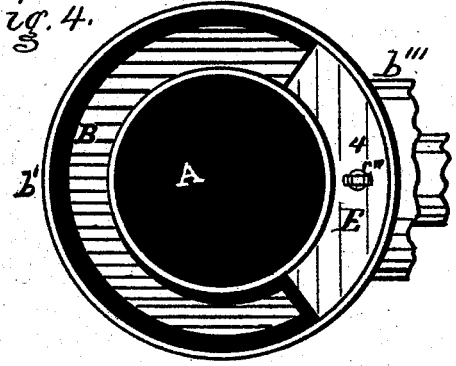
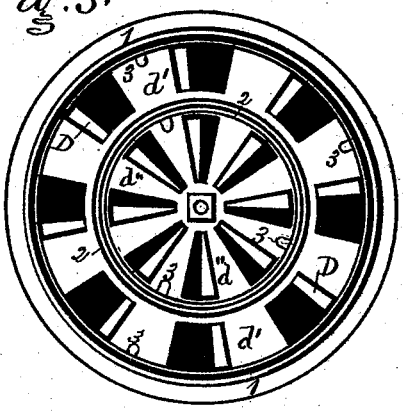
Witnesses:
Benj. Morison.
Wm H. Morison.
Inventor:
George R. Barker

UNITED STATES PATENT OFFICE.

GEORGE R. BARKER, OF PHILADELPHIA, PENNSYLVANIA.

IMPROVEMENT IN VENTILATORS FOR BUILDINGS.

Specification forming part of Letters Patent No. 143,868, dated October 21, 1873; application filed August 2, 1873.

*To all whom it may concern:*

Be it known that I, GEORGE R. BARKER, of the city of Philadelphia and State of Pennsylvania, have invented an Improvement in Ventilators for Buildings, of which the following is a specification:

My invention relates to the improved ventilator for which Letters Patent No. 111,718 were granted to me dated February 14, 1871; and consists in the mode of constructing and applying the same to the floor of a building, so that while the hot fresh air is passing up through the floor the contaminated or vitiated air will flow down through adjustable openings immediately around the central openings for the hot fresh air, into a suitable conduit-pipe leading to the chimney or other flue below the floor, the object being to afford a more perfect ventilation of churches and other assembly buildings, which receive the hot air directly through the floor of the same.

Figure 1 is a central vertical section of a floor-ventilator embodying my invention. Fig. 2 is a plan view of the upper side of the floor-plates of the said improved ventilator; and Fig. 3 is a like view of the under side of said floor-plates. Fig. 4 is a top view of the said ventilator having the said floor-plates removed, in order to expose the interior construction and arrangement of the parts whereby the hot fresh air is conducted upward through the floor, and the vitiated air conducted down through the floor to the escape-pipe leading along under the floor to the chimney, not shown.

The hot air of the furnace, usually located in the basement or cellar of the building, passes up through the usual hot-air flue A, which reaches nearly up to the upper side of the floor, indicated by the dotted lines $v\ w$ in Fig. 1. The upper part of the hot-air flue A is surrounded by a casing, $b'$, which reaches from a little below the upper surface of the floor $v\ w$ downward about eighteen inches, more or less, to its bottom plate $b''$, which fits air-tight around against the outside of the hot-air flue A, and leaves an annular space, B, for the downward passage of the vitiated air to the conduit-pipe $b'''$, which extends along under the floor $v\ w$ to the usual chimney of the furnace or other escape flue. In one side of the hot-air flue A there is an opening fitted with a small pipe, C, which extends a short distance, concentrically, through the vitiated-air flue or conduit-pipe $b'''$, and is fitted with a stop-valve, $c'$, whereby the hot air may be turned into the vitiated-air flue $b'''$, when it becomes desirable to shut off the hot air from the room above the floor $v\ w$. The top or floor plates consist of three distinct parts, D $d'$ $d''$. The top plate D extends over the whole area of the opening in the floor $v\ w$, and has a flange, 1, which fits within the mouth of the foul or vitiated air entrance B; and also an inner flange, 2, which fits within the mouth of the hot-air flue A, both in such a manner as will permit the said plates to be easily lifted off and replaced, as may at any time be required to give access to the said flues A and B for cleaning or removing dust, &c. The lower plates $d'$ and $d''$ are movable, the inner one, $d''$, turning on a center-pin in D, so as to open and close sectoral openings in the upper plate D, and thus serving as a register-plate for the hot-air flue A, the said registering-plate $d''$ having sectoral openings and blank spaces to correspond with those of the top plate D; and the outer plate, $d'$, being annular, turns, in like manner, between the flanges 1 and 2, so as to open and close sectoral openings in the plate D, and thus serving as a register-plate for the vitiated-air flue B, the said registering-plate $d'$ having sectoral openings and blank spaces to correspond with those above them in the top plate D. The said registering-plates $d'$ and $d''$ are supported at their outer edges by means of small brackets 3 3 3, which are fixed to the flanges 1 and 2, respectively; and the required movements of the said registering-plates $d'$ and $d''$ are effected by means of short studs 4 4, one in each plate, which extend up to the top surface of plate D through one of the openings for the same in the appropriate series. Directly above the mouth of the vitiated-air flue $b'''$ there is a deflecting-plate, E, which supports the stem $c''$ of the valve $c'$ in the pipe C in a vertical position, and so as to be accessible through the opening above it in the top plate D, for the purpose of opening and closing the valve, as occasion may require, as will be described.

In the operation of the said improved floor-ventilator, when both series of openings in the plates D $d'$ $d''$ are uncovered by the appropriate movements of the registering-plates $d'$ $d''$, the hot air passes upward in the usual manner from the furnace (not shown) through the inner series of openings into the room of the building, the valve $c'$ being closed; and the vitiated air, being heavier, gradually sinks to the floor and flows along to and enters through the outer series of openings into the annular space which is between A and $b'$, and passes out through the pipe $b'''$ to the furnace-chimney, or to a ventilating flue or shaft; and should the room become too warm, all that is necessary to reduce the temperature is to open the valve $c'$ and close the central or hot air register-openings, and thus turn all the hot-air into the pipe $b'''$. The openings around the series of closed central openings remaining open for the entrance of the said vitiated air, and the heating of the flue $b'''$ by the introduction of the hot air into it through the valve-tube, greatly increase the flow of the vitiated air out of the room.

If an elevated entablature or guard-screen be desired, the same can be readily applied, as indicated by the dotted lines $x$ $x$ $y$, either over the hot-air openings or over both series, the two currents of air, in the latter case, passing through side openings in the entablature, provided at the floor for the heavy or vitiated air, and above the same for the hot air, the two being separated by a close partition.

One advantage afforded by my invention is that the vitiated air can be perfectly carried off by the single pipe $b'''$ to the chimney or ventilating shaft, and thereby the cost of numerous pipes and register-plates for the purpose, as generally required, is avoided. Another advantage attainable is that my invention can be readily applied to the floor-ventilators in use at a very small cost.

I claim as my invention—

In combination with the hot-air flue A and its ventilating-plate D and register-plate $d'$, the surrounding vitiated-air chamber B and exit-pipe $b'''$, and the surrounding series of openings in the floor-plate with their annular register-plate $d'$, the said parts being constructed to operate substantially as and for the purpose set forth.

GEORGE R. BARKER.

Witnesses:
 BENJ. MORISON,
 WM. H. MORISON.